J. Cozad,
Broad Cast Seeder.
No. 110,634.  Patented Jan. 3, 1871.

Witnesses:
Chas. Nida
L. S. Mabee

Inventor:
J. Cozad
Per Munn & Co.
Attorneys.

United States Patent Office.

JACKSON COZAD, OF CORYDON, IOWA.

Letters Patent No. 110,634, dated January 3, 1871.

IMPROVEMENT IN SEEDING-MACHINES.

The Schedule referred to in these Letters Patent and making part of the same.

*To all whom it may concern:*

Be it known that I, JACKSON COZAD, of Corydon, in the county of Wayne and State of Iowa, have invented a new and improved Seeding-Machine; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
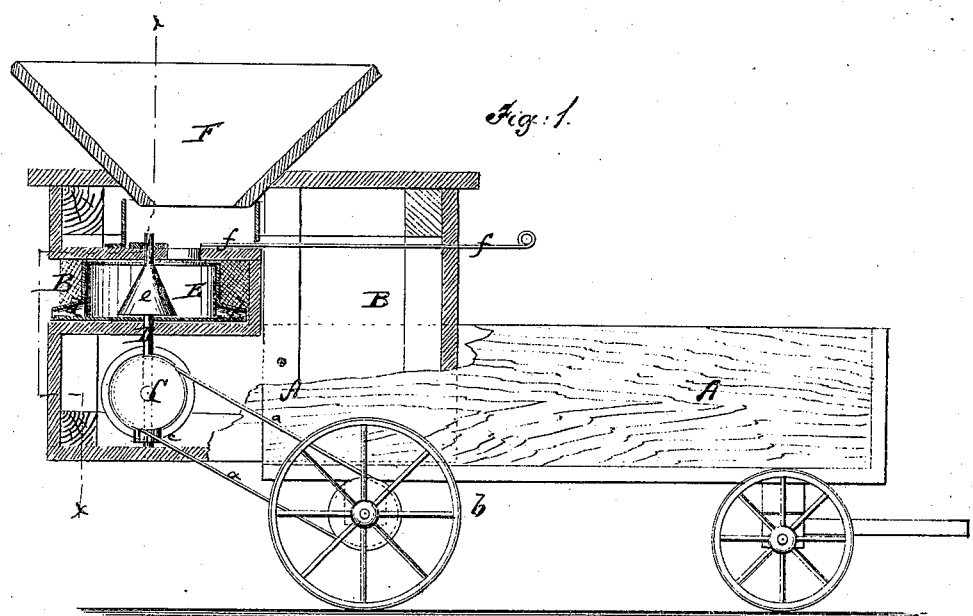
Figure 1 represents a vertical longitudinal section of my improved seeding-machine.
Figure 2:
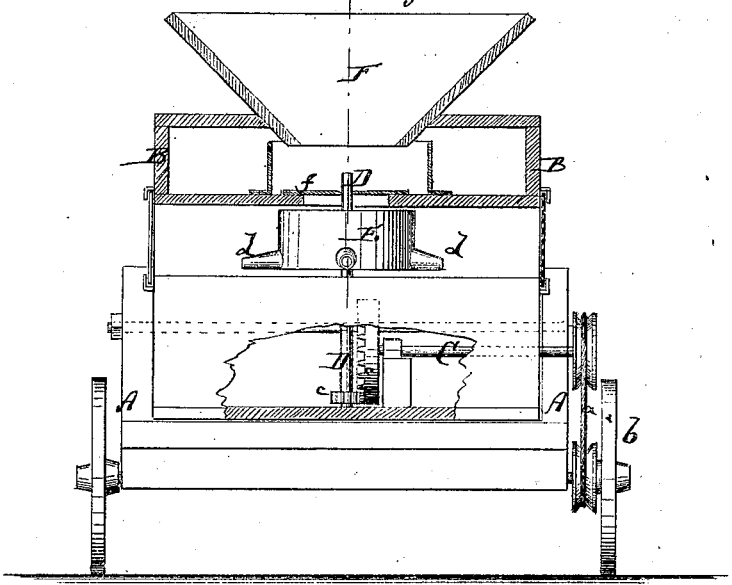
Figure 2 is a vertical transverse section of the same, $x\ x$, fig. 1, being the section line.

This invention relates to a new machine for scattering seed broadcast, and consists in the application and arrangement of a rotary basin, which serves, by centrifugal force, to throw the seed in all directions.

The apparatus is applicable to all wheeled vehicles, and readily detachable when not required for use.

A in the drawing represents a wagon or other wheeled vehicle or frame of suitable construction.

Upon the same is placed, and secured by screw or other means, but so as to be readily detachable, a box or case, B.

C is a horizontal shaft hung in the box B and connected by a belt, $a$, or gearing with one of the wheels $b$ of the vehicle A, to be revolved by the same when the vehicle is in motion.

D is a vertical spindle arranged in the box B, and connected, by gear-wheels $c\ c$, with the shaft C, to be rapidly revolved by the same.

This spindle D carries a cylindrical vessel, E, which has projecting tubular arms $d\ d$ at its lower part.

The upper end of the vessel E is open to a hopper, F, while its lower end is closed.

The spindle carries within the vessel E a cone, $e$, by which the seed is crowded toward the tubes $d$.

$f$ is a slide arranged between the hopper and vessel E, for regulating the size of opening and the consequent admission of seed to the vessel.

The operation is as follows:

The seed to be scattered is put into the hopper, and flows thence into the rotary vessel or basin E, which scatters it through the open-ended projections $d$ in all directions. By the slide the discharge of seed can be instantaneously regulated.

Having thus described my invention,

I claim as new and desire to secure by Letters Patent—

An inwardly-converging self-feeding hopper, F, and apertured box B, combined, as described, with a revolving vessel, E, having an inner conical seed-crowder, $e$, and radial tubular distributing-arms $d$, all arranged as described.

JACKSON COZAD.

Witnesses:
J. W. FREELAND,
JOSHUA ROBISON.